Nov. 26, 1940.  T. W. MILLER  2,222,852
FLUID DISPENSER
Filed Dec. 9, 1938
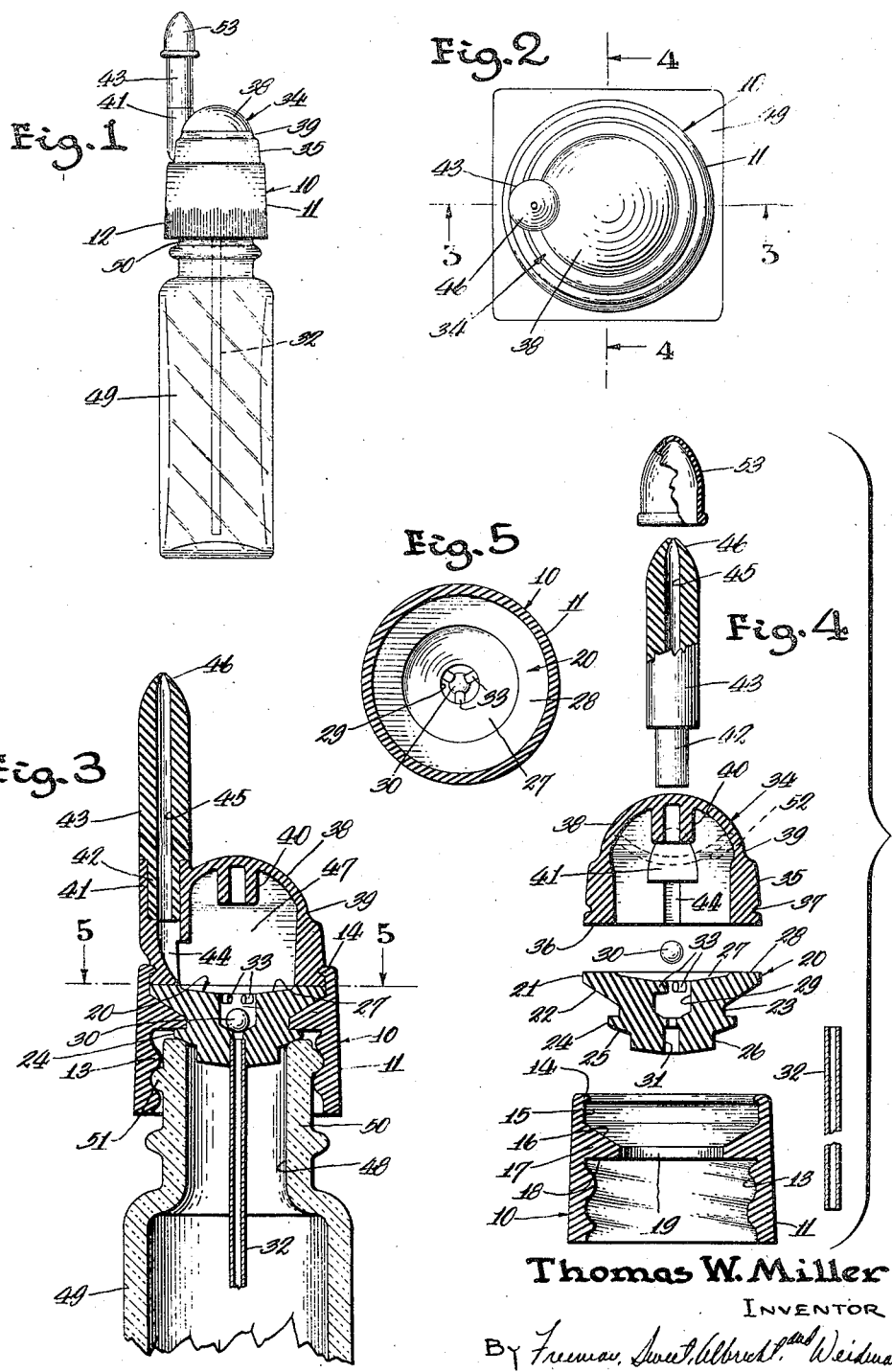
Thomas W. Miller
INVENTOR Patented Nov. 26, 1940

2,222,852

UNITED STATES PATENT OFFICE 2,222,852

FLUID DISPENSER

Thomas W. Miller, Ashland, Ohio, assignor to The Faultless Rubber Company, Ashland, Ohio, a corporation of Ohio Application December 9, 1938, Serial No. 244,808

5 Claims. (Cl. 128—231)

My invention relates to fluid dispensers, more particularly to combined closures and fluid dispensers for containers, and the principal object of my invention is to provide new and improved devices of this character.

In the drawing accompanying this specification, and forming part of this application, I have shown, for purposes of illustration, one form which my invention may assume, and in this drawing:

Figure 1 is a side elevational view of an embodiment of my invention applied to a bottle, Figure 2 is an enlarged top plan view of the embodiment shown in Figure 1, the cap used for shipping and traveling being removed, Figure 3 is a fragmentary sectional view corresponding generally to the line 3—3 of Figure 2, Figure 4 is a sectional view corresponding generally to the line 4—4 of Figure 2, the parts comprising the embodiment being shown in separated relation, and the cap omitted in Figures 2 and 3 being added, and Figure 5 is a horizontal sectional view corresponding generally to the line 5—5 of Figure 3.

The embodiment of this invention comprises cap means 10, formed of substantially rigid material, preferably hard rubber or the like. The cap means 10 has a skirt portion 11, which may have its exterior surface roughened, as by fluting shown at 12, and the skirt portion is provided with screw-threads 13 formed on its interior surface. The top wall of the cap means 10 is apertured, and has an annular lip 14 overhanging an annular recess 15, the wall defining the recess 15 merging with a downwardly inclined top wall 16 of an inwardly extending annular projection 17, the lower wall of the projection 17 being substantially flat and providing a shoulder 18. The projection 17 is apertured, as shown at 19.

A body 20 is carried by the cap means 10, and is preferably formed of soft resilient rubber. The body 20 has a circular part 21 fitting within the recess 15 of the cap means 10, and an annular downwardly tapering part 22 closely fitting the inclined wall 16 of the projection 17. The tapering part 22 leads to a cylindrical part 23 which is disposed intermediate the tapering part 22 and an annular flange 24. The flange 24 bears against the shoulder 18 of the cap means 10, and thus holds the body 20 assembled with the cap means 10. The lower surface of the flange 24 provides a sealing surface 25, and extending downwardly from this sealing surface is a reduced annular part 26. The upper part of the body 20 is provided with a central downwardly inclined recess 27, which is surrounded by a substantially flat annular surface 28. The body 20 is formed with an aperture extending centrally therethrough, and this aperture communicates with the recess 27, and has an enlarged portion 29 forming a chamber for a ball valve 30, the lower wall of the chamber 29 being tapered to effect seating of the ball. Communicating with the chamber 29 is an aperture 31 adapted to receive a tube 32 of relatively small diameter. The aperture 31 has a reduced portion disposed between it and the chamber 29, forming a shoulder which limits the insertion of the tube 32 into the aperture 31. Means are provided to retain the ball 30 in operative position, yet permitting free assembly and disassembly of this ball from its chamber 29, and as here shown this means comprises three horizontally extending projections 33, preferably molded integrally with the body 20, and forming a yieldable barrier which prevents the ball from being displaced from the chamber 29 under ordinary circumstances.

Also carried by the cap means 10 is a bulb means 34, preferably formed of soft resilient rubber. The bulb means 34 has a skirt portion 35, open at its lower end, and having a relatively plane surface 36 at this open end, and an annular groove 37 spaced slightly from the plane surface 36. The skirt 35 merges with a dome-shaped portion 38, the thickness of this dome-shaped portion being less than the thickness of the skirt portion 35, and the connection of the dome-shaped portion 38 with the skirt portion 35 is formed as shown at 39 to facilitate flexing at this point. The dome-shaped portion 38 may have a projection 40 extending inwardly of the bulb means 34.

Positioned off-center with respect to the bulb means 34, and preferably integrally connected therewith, is an upright boss 41, which is apertured to receive the lower reduced end 42 of a nozzle 43, the aperture of the boss being continued through the skirt portion 35, as shown at 44, so as to communicate with the interior of the bulb means 34. The nozzle 43 is provided with a bore 45, and this bore is reduced to a very small opening at the free extremity 46 of the nozzle 43.

To assemble the parts hereinbefore described, the bulb means 34 is preferably secured to the body 20 in fluid-tight relation, and this may be effected by connecting the plane surface 36 of the bulb means 34 to the plane surface 28 of the body 20 by means of a suitable cement or the like, thus forming a unitary structure which includes the bulb means 34 and the body 20. This unitary structure provides a chamber 47 defined by the inner walls of the bulb means 34 and the upper surface of the body 20. The unitary structure may be assembled with the cap means 10 by inserting the lower end of the body 20 through the aperture 19 in the cap means 10 an amount necessary to pass the flange 24 through the aperture 19. The upper surface of the flange 24 then yieldably engages the shoulder 18 of the cap means 10, as shown in Figure 3, and thus provides fluid-tight connection between the unitary structure and the cap means 10. At the same time, the lip 14 of the cap means 10 seats in the groove 37 of the bulb means 34, thus assisting to hold the bulb means 34 and the body 20 assembled with the cap means 10. The flange 24 and shoulder 18, and the groove 37 and the lip 14, are so constructed and arranged that the plane surfaces 28 and 36 of the body 20 and bulb means 34 respectively, are pressed tightly together, and if desired, the cement joining these plane surfaces may be omitted, so that the body 20 and the bulb means 34 may be assembled individually with respect to the cap means 10. The reduced end 42 of the nozzle 43 may be inserted into the apertured boss 41, and the tube 32 may be inserted within the aperture 31 of the body 20 at any convenient time during assembly operation.

The combined closure and dispenser thus formed is adapted to cover the opening 48 of a container 49, such as the bottle herein shown. The container 49 may have a neck 50 surrounding the opening 48, and this neck 50 may be provided with exterior screw-threads 51 adapted to cooperate with the interior screw-threads 13 of the cap means 10, and in this manner hold the combined closure and dispenser in position on the container. The tube 32 is preferably of a length to stop short of the bottom of the container, as shown in Figure 1.

To operate the dispenser, assuming that the parts are assembled in the manner shown in Figure 3, and that the bottle 49 contains a suitable fluid, such as a medicinal liquid, a user depresses the dome-shaped portion 38 of the cap means 34, for instance to the position shown in the dotted lines 52 in Figure 4, thus expelling air from the chamber 47. Removal of the pressing force permits the dome-shaped portion 38 to spring back to its original position, thus drawing fluid from the bottle 49 through the tube 32, past the ball valve 30, and into the chamber 47. This fluid is prevented from running back into the bottle 49 by the seating of the ball 30. Subsequent depressing of the dome-shaped portion 38 will force this fluid through the passage 44, the aperture in the boss 41, the bore 45 of the nozzle 43, and outwardly through the small aperture in the extremity 46 of the nozzle 43, the fluid emerging in a jet-like stream. It will be appreciated that when this subsequent pressing force is released, additional fluid will be drawn into the chamber 47, and this fluid may be expelled from the nozzle 43 in the manner described. The projection 40, extending inwardly of the bulb means 34, may be so constructed and arranged to limit the inward pressing of the dome-shaped portion 38 by contact with the upper surface of the body 20.

Any unused fluid in the chamber 47 will drain along the inclined surfaces 27 into the ball chamber 29, and will eventually pass the ball 30, because this ball is not tightly held to its seat, and finally return to the bottle 49. To prevent any fluid from unintentionally passing through the nozzle 43 during shipping or traveling, a cap 53, preferably formed of soft rubber, and having a shape similar to the extremity of the nozzle 43, may be fitted over this extremity.

It will be appreciated that the nozzle 43, bulb means 34, and cap means 10 may be of different colors to enhance the attractiveness of the combined closure and dispenser.

From the foregoing it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A fluid dispenser for a container, comprising: means connectable to the container and providing a chamber and including a wall portion so constructed and arranged as to be movable from an outer position inwardly of said chamber to reduce the size of said chamber; conduit means providing for passage of fluid from the container to said chamber; said chamber having a dispensing opening arranged so that when said wall portion is moved inwardly of said chamber, air displaced from said chamber may be exhausted through said dispensing opening; and said dispensing opening being of such relatively small cross-section that when said wall portion is returned to its outer position, inflow of air through said dispensing opening to said chamber is retarded, and fluid from the container is drawn through said conduit means into said chamber to be dispensed through said dispensing opening upon a subsequent inward movement of said wall portion.

2. A fluid dispenser for a container, comprising: means connectable to the container and providing a chamber and including a wall portion so constructed and arranged as to be movable from an outer position inwardly of said chamber; conduit means providing for passage of fluid from the container to said chamber; valve means, so constructed and arranged as to open when fluid passes through said conduit means to said chamber, and to close when fluid attempts to pass from said chamber through said conduit means and to the container; said chamber having a dispensing opening; and said wall portion being so constructed and arranged that when it is moved inwardly of said chamber it reduces the size of said chamber, the air compressed in said chamber urging said valve means to closed position so that air is displaced from said chamber through said dispensing opening, said dispensing opening being of such relatively small cross-section so that when said wall portion is moved to its outer position, inflow of air through said dispensing opening to said chamber is retarded, and fluid from the container is drawn through said conduit means past said valve means and into said chamber to be dispensed through said dispensing opening upon a subsequent inward movement of said wall portion.

3. A fluid dispenser for a container, comprising: cap means, connectable to the container at its outlet; resilient bulb means, carried by said cap means, and so constructed and arranged as to form a chamber with said cap means, said bulb means having an opening through which fluid may be dispensed; conduit means, carried by said cap means, and extending into the fluid in the container when said cap means is in position on the container, said conduit means providing for passage of fluid from the container to said chamber; a wall portion of said bulb means being movable inwardly of said chamber by pressure thereon so as to reduce the size of said chamber, the air displaced from said chamber being exhausted through said dispensing opening in said bulb means, said wall portion resiliently returning to its normal position when pressure thereon is released; said dispensing opening being of such relatively small cross-section that when said wall portion is returned to its normal position, the inflow of air through said dispensing opening is retarded, and fluid from the container is drawn through said conduit means into said chamber to be dispensed through said dispensing opening upon a subsequent pressure causing inward movement of said wall portion.

4. A fluid dispenser for a container, comprising: cap means, connectable to the container at its outlet; resilient bulb means, carried by said cap means, and so constructed and arranged as to form a chamber with said cap means, said bulb means having an opening through which fluid may be dispensed; conduit means, carried by said cap means, and extending into the fluid in the container when said cap means is in position on the container, said conduit means providing for passage of fluid from the container to said chamber; valve means, so constructed and arranged as to open when fluid passes through said conduit means to said chamber, and to close when fluid attempts to pass from said chamber through said conduit means and to the container; a wall portion of said bulb means being movable inwardly of said chamber by pressure thereon so as to reduce the size of said chamber, the air thus compressed in said chamber urging said valve means to closed position so that air is displaced through said dispensing opening in said bulb means, said wall portion resiliently returning to its normal position when pressure thereon is released; said dispensing opening being of such relatively small cross-section that when said wall portion is returned to its normal position, inflow of air through said dispensing opening to said chamber is retarded, and fluid from the container is drawn through said conduit means past said valve means and to said chamber to be dispensed through said dispensing opening upon a subsequent pressure causing inward movement of said wall portion.

5. A fluid disepnser for a container, comprising: cap means, connectable to the container, and having an aperture in its top wall; resilient sealing means, carried by said cap means in position to engage the lip surrounding the container opening, said sealing means having an aperture extending therethrough, one end of which is enlarged to form a well providing a valve seat, said sealing means, at the opening to said well being formed with integral radially extending projections; tube means, having its one end extending into the opposite end of said sealing means aperture and gripped by the adjacent marginal surface of said aperture, and its opposite end extending into the fluid in the container when the dispenser is in position on the container; a ball valve, disposed within said well in position to cooperate with said valve seat, and being assemblable or disassemblable with respect to said well by forcing it past said radially extending projections, said ball valve being so constructed and arranged that it is unseated when fluid passes through said tube means to said chamber; and resilient bulb means, carried by said cap means, constructed and arranged to form a chamber communicating with the interior of the container through the apertures in said cap means and said sealing means, said bulb means being compressible to expel air from said chamber, and being resiliently expansible from its compressed position to draw fluid past said ball valve and inwardly of said chamber, said bulb means having an opening through which this fluid may be dispensed by a subsequent compression of said bulb means.

THOMAS W. MILLER.